(12) United States Patent
Hanson

(10) Patent No.: US 7,648,661 B2
(45) Date of Patent: Jan. 19, 2010

(54) RAPID RECONFIGURABLE FUSELAGE MANDREL

(75) Inventor: Steven F. Hanson, Derby, KS (US)

(73) Assignee: Spirit Aerosystems, Inc., Wichita, KS (US)

( * ) Notice: Subject to any disclaimer, the term of this patent is extended or adjusted under 35 U.S.C. 154(b) by 0 days.

(21) Appl. No.: 12/196,957

(22) Filed: Aug. 22, 2008

(65) Prior Publication Data

US 2009/0051069 A1 Feb. 26, 2009

Related U.S. Application Data

(60) Provisional application No. 60/957,372, filed on Aug. 22, 2007.

(51) Int. Cl.
*B29C 33/40* (2006.01)
(52) U.S. Cl. .................. 264/226; 264/257; 264/258; 264/313; 264/314; 264/225; 264/227
(58) Field of Classification Search .............. 264/257, 264/258, 313–314, 225–227
See application file for complete search history.

(56) References Cited

U.S. PATENT DOCUMENTS

| 6,310,131 | B1 | 10/2001 | Tan |
| 6,398,992 | B1 | 6/2002 | Jacobson |
| 6,780,352 | B2 | 8/2004 | Jacobson |
| 7,172,714 | B2 * | 2/2007 | Jacobson .............. 264/37.1 |
| 2002/0056788 | A1 * | 5/2002 | Anderson et al. ......... 244/119 |
| 2004/0070108 | A1 * | 4/2004 | Simpson et al. .......... 264/236 |

FOREIGN PATENT DOCUMENTS

GB 2243107 A * 10/1991

* cited by examiner

*Primary Examiner*—Philip C Tucker
*Assistant Examiner*—Amjad Abraham
(74) *Attorney, Agent, or Firm*—Hovey Williams LLP

(57) ABSTRACT

A system and method for making and using a reconfigurable composite part mandrel operable in the manufacture of composite parts. The system may comprise an assembly fixture, a generic mandrel, a reconfigurable simulated skin, a reconfigurable frame portion, and state-changing material operable to harden into a desired configuration for forming a particular composite part. The method of forming and using the reconfigurable composite part mandrel may comprise: inserting the simulated skin within the assembly fixture, inserting or assembling the frame portion within the assembly fixture; inserting the generic mandrel into the assembly fixture; filling a cavity between the generic mandrel and the assembly fixture with the state-changing mixture to encapsulate the frame portion; hardening the state-changing mixture; and removing the assembly fixture and the simulated skin.

5 Claims, 10 Drawing Sheets

RAPID RECONFIGURABLE FUSELAGE MANDREL

RELATED APPLICATIONS

This nonprovisional patent application claims priority benefit, with regard to all common subject matter, of earlier-filed U.S. provisional patent application titled "Rapid Reconfigurable Fuselage Mandrel", Ser. No. 60/957,372, filed Aug. 22, 2007, hereby incorporated by reference in its entirety into the present application.

BACKGROUND

1. Field

The present invention relates to a system and method for manufacturing composite parts using a reconfigurable fuselage mandrel. More particularly, the present invention relates to a system having an assembly fixture, a generic mandrel, a reconfigurable simulated skin, a reconfigurable frame portion, and state-changing material operable to harden into a desired configuration for forming a particular composite part.

2. Related Art

In the manufacturing of composite parts, such as those used in aircrafts, permanent tooling is generally used to create the proper templates or molds to form the composite parts of a given size, shape, and configuration. The permanent tooling can be costly and time-consuming to make and especially to modify.

One type of permanent tooling used in the fabrication of composite parts is a mandrel. Most mandrels are machined from solid pieces of material such as aluminum or cast into a fixed shape and cannot be easily reconfigured. For example, in the manufacturing of an aircraft fuselage, a frame portion may be locked into a particular configuration as dictated by the permanent tooling. Therefore, if another frame configuration is desired, a different permanent tool has to be made.

Accordingly, there is a need for an improved system and method for forming reconfigurable and inexpensive tooling for the manufacture of composite parts that overcomes the limitations of the prior art.

SUMMARY

The present invention provides a system and method of rapidly forming and using a reconfigurable composite part mandrel, such as a rapid reconfigurable fuselage mandrel for forming a composite fuselage for an aircraft. The reconfigurable composite part mandrel, for example, may be used to set the size, shape, and configuration of a composite part.

One embodiment of the system may comprise a generic mandrel having an outer surface and a state-changing mixture, hardened and affixed to and surrounding the generic mandrel. The hardened state-changing mixture may be of a shape and configuration corresponding with the shape and configuration of the internal surface of a fuselage skin. Additionally, the system may comprise a frame portion, such as a fuselage frame portion, affixed to the hardened state-changing mixture, and an assembly fixture having inwardly facing walls. The system may further comprise a simulated skin configurable to represent the composite part to be formed by the reconfigurable composite part mandrel.

The generic mandrel may be sized to fit inward of the inwardly facing walls of the assembly fixture such that the outer surface of the generic mandrel does not physically contact the inwardly facing walls. The simulated skin and the fuselage frame portion may be disposed between the generic mandrel and the assembly fixture.

The state-changing mixture may be affixed to the generic mandrel and the fuselage frame portion by injecting the state-changing mixture, in a wet form, between the generic mandrel and the assembly fixture and then pumping liquid out of the state-changing mixture and heating it, such that it hardens against the generic mandrel and the fuselage frame portion.

One embodiment of the method may comprise: assembling the frame portion within the assembly fixture; inserting the generic mandrel into the assembly fixture; filling a cavity between the generic mandrel and the assembly fixture with the state-changing mixture to encapsulate the frame portion; hardening the state-changing mixture; and removing the assembly fixture.

Additionally, the method may include inserting a simulated skin within the assembly fixture prior to inserting the frame portion. The simulated skin may also be removed after the state-changing mixture hardens, along with the assembly fixture. The method may also comprise inserting a bag over the frame portion and at least a portion of the assembly fixture prior to inserting the generic mandrel, and then pulling the bag down against the frame portion by vacuum force.

A method for using the reconfigurable composite part mandrel formed by the system and method above to manufacture a composite part may comprise winding, laying up, or placing composite material around the reconfigurable composite part mandrel, including the hardened state-changing mixture and frame portion, after removing the assembly fixture and simulated skin. Then the composite material may be hardened or cured in one of a plurality of ways. For example, the composite material may be hardened by: compressing the composite material with caul sheets and pressure applied by a vacuum bag, then heating the composite material; inserting the reconfigurable composite part mandrel and composite material into the assembly fixture, then heating the composite material; or placing the composite material and the frame portion into the assembly fixture, removing the state-change material and the generic mandrel, then heating the composite material.

These and other important aspects of the present invention are described more fully in the detailed description below.

BRIEF DESCRIPTION OF THE DRAWINGS

Embodiments of the present invention are described in detail below with reference to the attached drawing figures, wherein.

Figure 1:
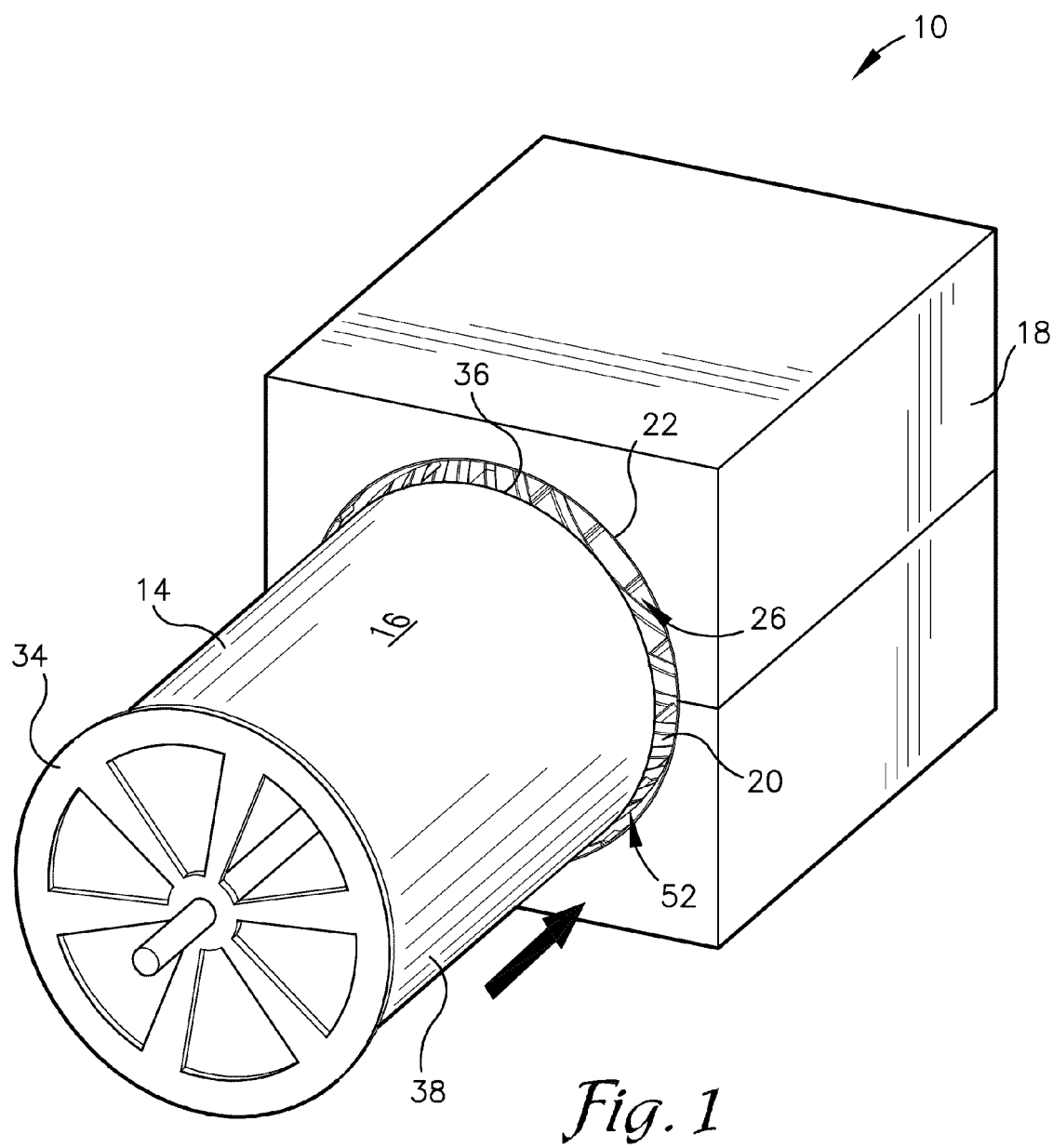
FIG. 1 is a perspective view of a system for forming a reconfigurable composite part mandrel constructed in accordance with an embodiment of the present invention.

The drawing figure does not limit the present invention to the specific embodiments disclosed and described herein. The drawing is not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
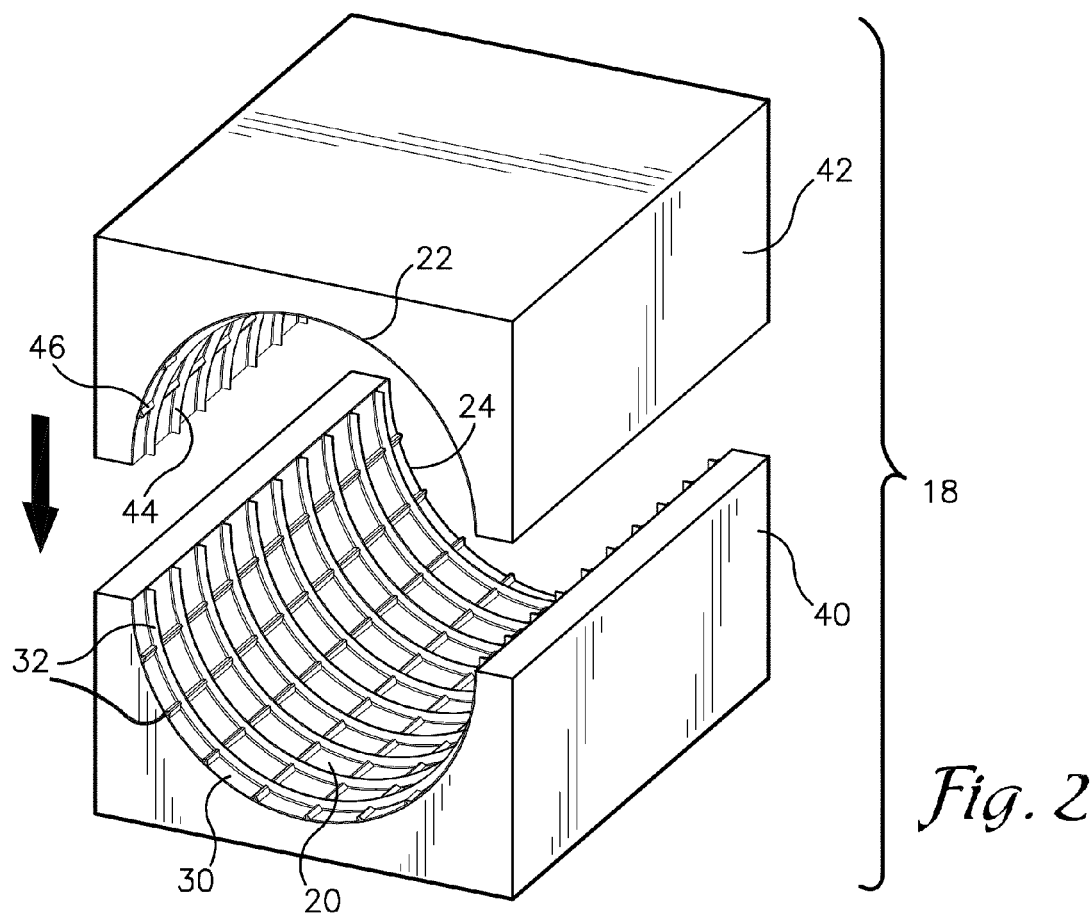
FIG. 2 is a perspective view of an assembly fixture of the system of FIG. 1.
Figure 11:
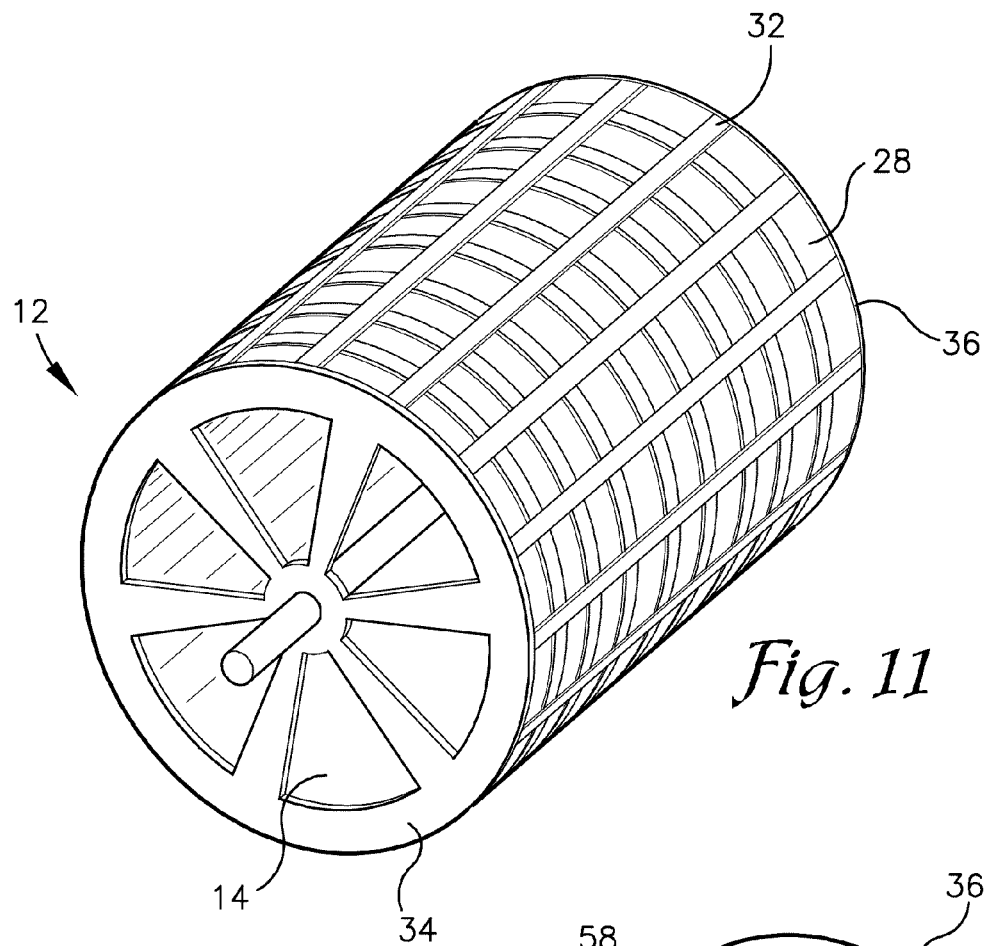
FIG. 11 is a perspective view of the frame portion and the reconfigurable composite part mandrel formed by the system of FIG. 1.

As illustrated in FIGS. 1 and 2, the present invention provides a system 10 and method for rapidly forming and using a reconfigurable composite part mandrel 12, depicted in FIG. 11. The reconfigurable composite part mandrel 12 may be used to set the size, shape, and configuration of a composite part. Specifically, the reconfigurable composite part mandrel 12 may be a rapid reconfigurable fuselage mandrel for forming a composite fuselage for an aircraft.

Figure 3:
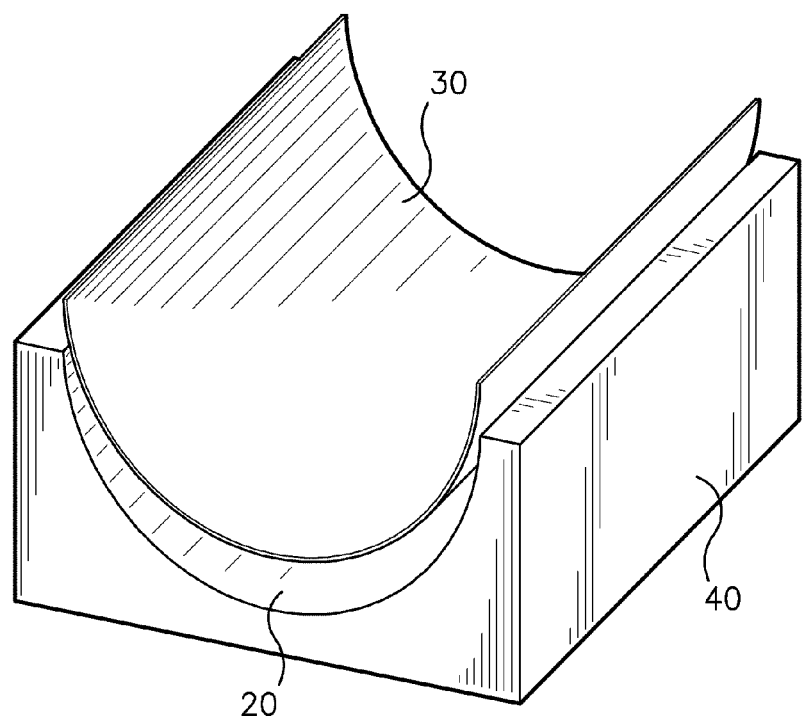
FIG. 3 is a perspective view of one portion of the assembly fixture and a simulated skin of the system of FIG. 1.
Figure 4:
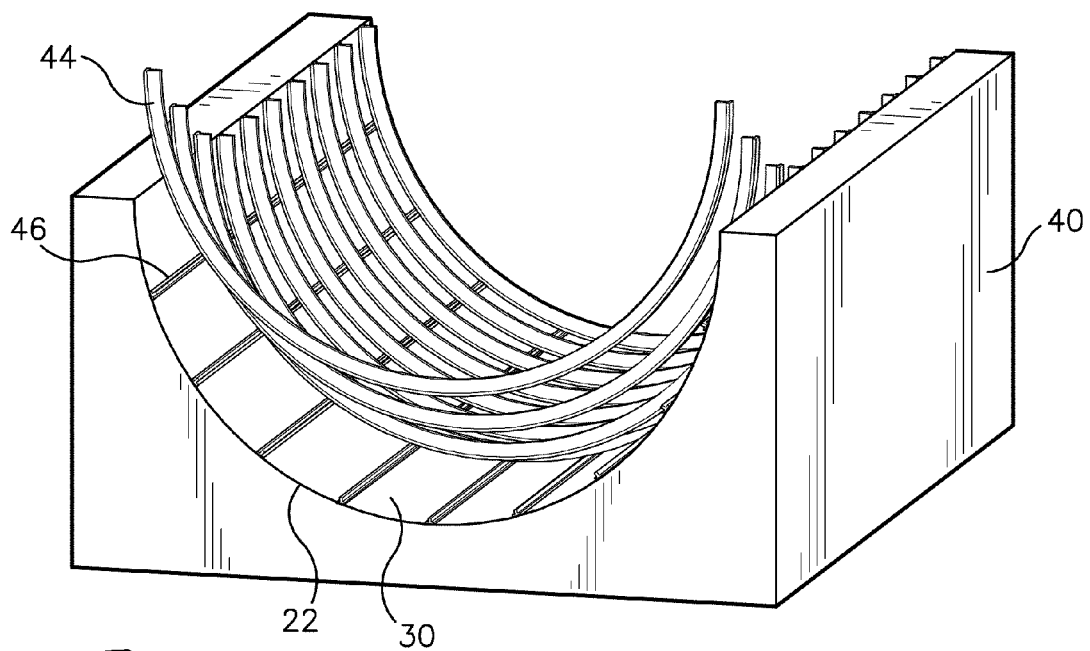
FIG. 4 is a perspective view of a frame portion (including frames and stringers) of the system of FIG. 1 on one portion of the assembly fixture.

The system 10 for forming the reconfigurable composite part mandrel 12 may comprise a generic mandrel 14 having an outer surface 16, an assembly fixture 18 having inwardly facing walls 20 forming a first opening 22 and a second opening 24 at either end of a hollow center 26, and a state-changing mixture 28, as depicted in FIGS. 7-11. Additionally, the system 10 may comprise a simulated skin 30, as illustrated in FIG. 3, configurable to represent the composite part to be formed by the reconfigurable composite part mandrel 12 and a frame portion 32, such as a fuselage frame portion, as illustrated in FIG. 4.

The generic mandrel 14 may be a spool made of any substantially rigid material, such as aluminum, fiberglass, or tooling board, having a first end 34, a second end 36, and a middle portion 38 sized to fit inside the hollow center 26 of the assembly fixture 18 such that the outer surface 16 of the generic mandrel does not physically contact the inwardly facing walls 20. The middle portion 38 of the generic mandrel 14 may be substantially cylindrical, or any other shape required for a particular application. The first and second ends 34,36 of the generic mandrel 14 may be sized equal to or larger than the first and second openings 22,24 of the assembly fixture 18, such that the first end and the second end 34,36 of the generic mandrel 14 may seal the space between the middle portion 38 of the generic mandrel 14 and the inwardly facing walls 20 of the assembly fixture 18. In various embodiments of the invention, at least one of the first end 34 and the second end 36 of the generic mandrel 14 may be detachable from its middle portion 38 to facilitate insertion of the generic mandrel 14 into the hollow center 26 of the assembly fixture 18.

The assembly fixture 18 may be made of any substantially rigid material, such as aluminum, fiberglass, or tooling board, and may have a plurality of portions 40,42, each comprising at least one of or a portion of the inwardly facing walls 20, such that the plurality of portions 40,42 may substantially fit together, forming the hollow center 26 of the assembly fixture 18. The hollow center 26 of the assembly fixture may be substantially cylindrical, or any other shape required for a particular application. The plurality of portions 40,42 of the assembly fixture 18 may be fixed one to another by any method known in the art. The assembly fixture 18 may also be referred to as a clamshell or a BAJ (bond assembly jig).

Preferably, the state-changing mixture 28 may be the state-changing mixture described in U.S. Pat. Nos. 6,398,992; 6,780,352; and 7,172,714, all of which are incorporated herein by reference in their entirety. The state-changing mixture 28, especially in a wet form, may be any non-homogeneous mixture containing a portion of solid matter and a portion of liquid matter. For example, the state-changing mixture 28 may be a mixture of uniform, generally ordered, closely-spaced solid bodies and a liquid carrier medium, with the liquid filling any voids or interstices between the bodies and excluding air or gas bubbles from the mixture. The state-changing mixture 28 in a wet state may transition to a solid, hardened, or stable state by extracting a transition liquid, causing the solid bodies to make stable, consolidated contact. A ceramic matrix of the state-changing mixture 28 may also be solidified with heat once its liquid is extracted.

As illustrated in FIG. 3, the simulated skin 30, also referred to as dummy skin, may be made of any substantially rigid material, placed and/or built onto the inwardly-facing walls 20 of the assembly fixture 18, and configured to simulate the size, thickness, shape, and configuration of the composite part to be formed. For example, cut-outs for windows, doors, etc. of the fuselage could be simulated using an Invar (iron-nickel) or composite ring with a cutter groove in it. By changing the size, thickness, shape, and configuration of the simulated skin 30, these attributes may also be changed in the composite part to be formed, as described herein.

As illustrated in FIG. 4, the frame portion 32 may be formed or positioned over the simulated skin 30 within the hollow center 26 of the assembly fixture 18, and may made of any substantially durable material. For example, the frame portion 32 may be any type of fuselage frame known in the art, made of one or a plurality of pieces. Specifically, the frame portion 32 may be a series of elongated beams or rods in a variety of configurations, such as frames 44 and/or stringers 46. For example, the frame portion 32 may be a durable, rib-like structure for providing strength and support to a fuselage of an aircraft. Various structural configurations for the frame portion 32 may include, frame and stringer, honeycomb, and iso-grid stiffening. In a frame and stringer configuration, pre-cured or partially cured frames 44 and stringers 46 may be placed onto the simulated skin 30 one at a time and placed apart by a desired distance according to the requirements of a given composite part design.

Figure 7:
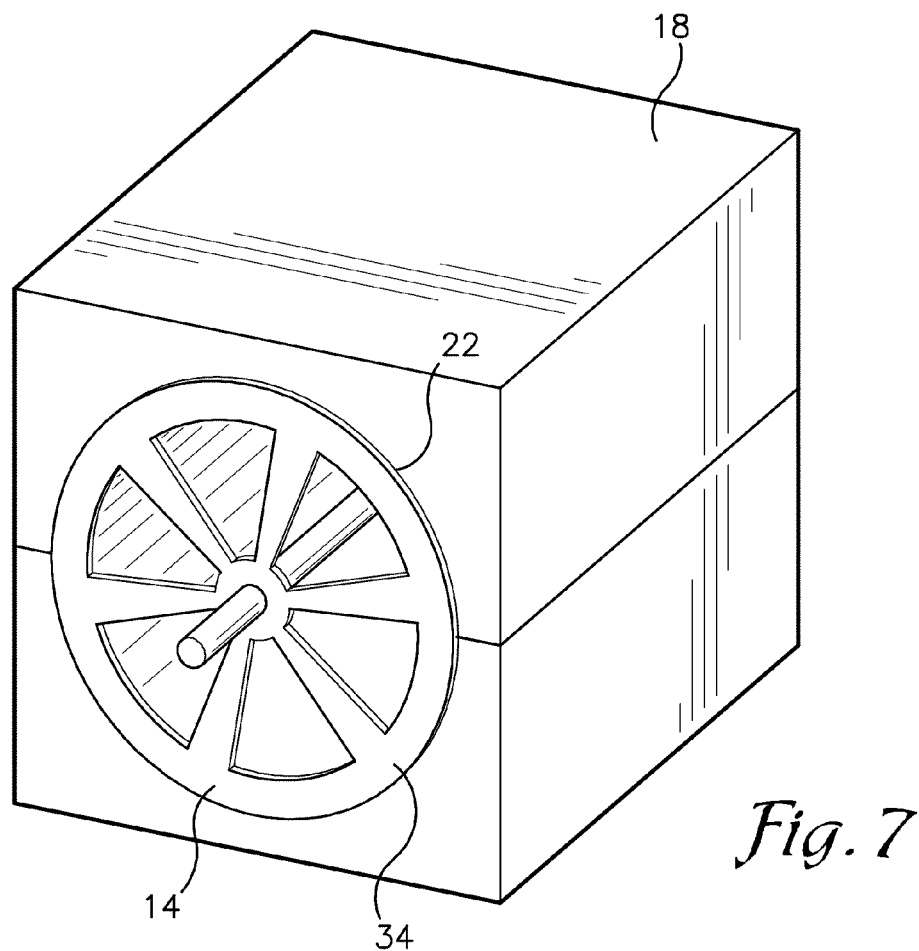
FIG. 7 is a perspective view of the system of FIG. 1 with a generic mandrel inside of the assembly fixture.
Figure 8:
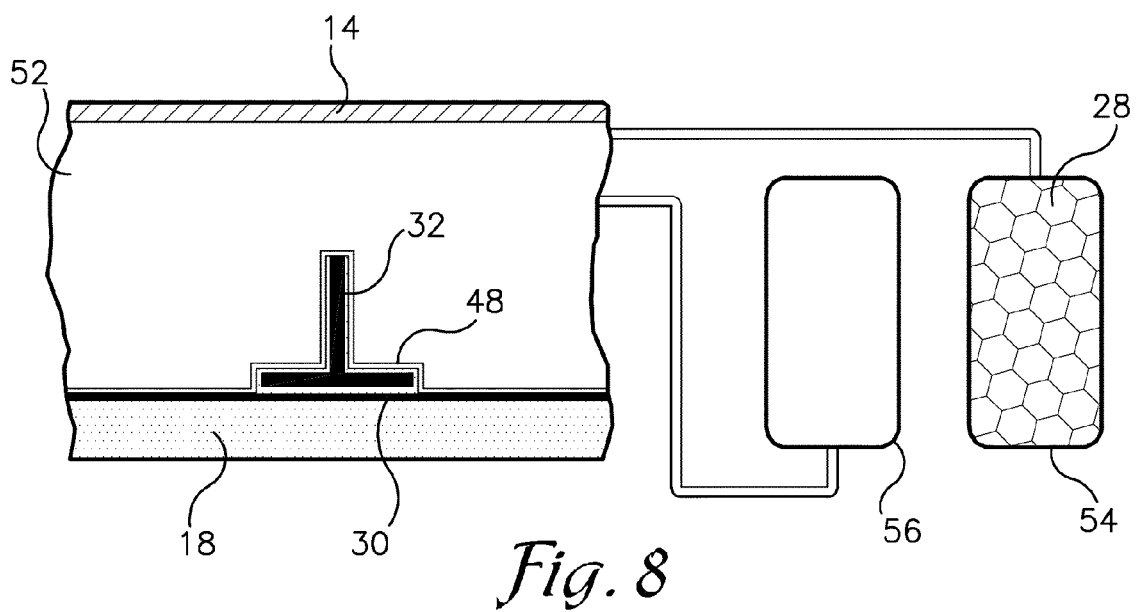
FIG. 8 is a partial, cross-sectional schematic view of the generic mandrel and the assembly fixture of FIG. 1.
Figure 9:
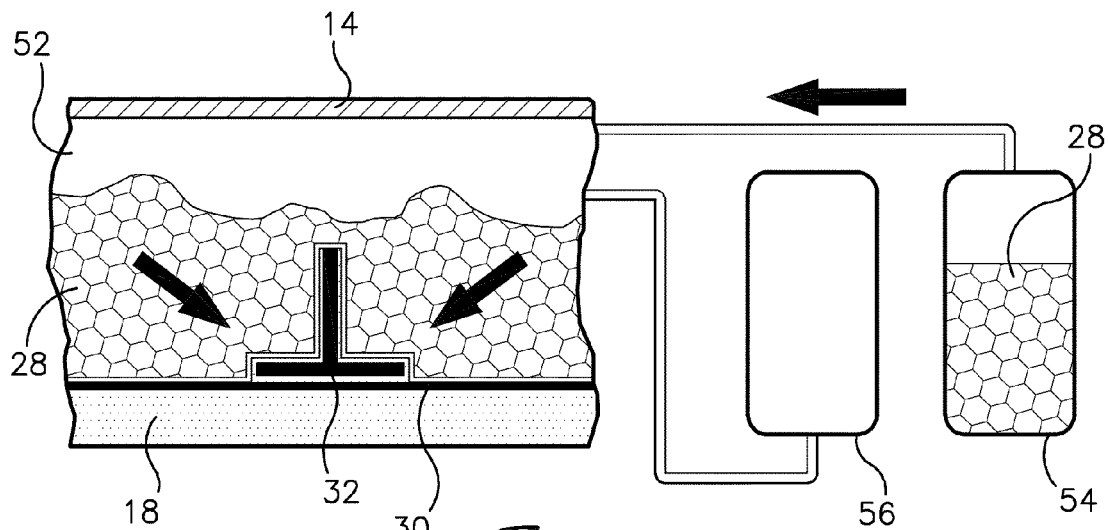
FIG. 9 is a partial, cross-sectional schematic view of the generic mandrel and the assembly fixture of FIG. 1 having state-changing mixture pumped therebetween.

In various embodiments of the invention, the simulated skin 30 and the frame portion 32 may be disposed between the middle portion 38 of the generic mandrel 14 and the inwardly-facing walls 20 of the assembly fixture 18. The state-changing mixture 28 may be affixed to the generic mandrel 14 and the frame portion 32 by inserting the state-changing mixture 28, in a wet form, between the generic mandrel 14 and the assembly fixture 18 and then pumping liquid out of the state-changing mixture 28 and heating it, such that it hardens against the generic mandrel 14 and the frame portion 32, as illustrated in FIGS. 7-9. The hardened state-changing mixture 28 may then be of a shape and configuration corresponding with the shape and configuration of a surface of the composite part to be formed.

Figure 15:
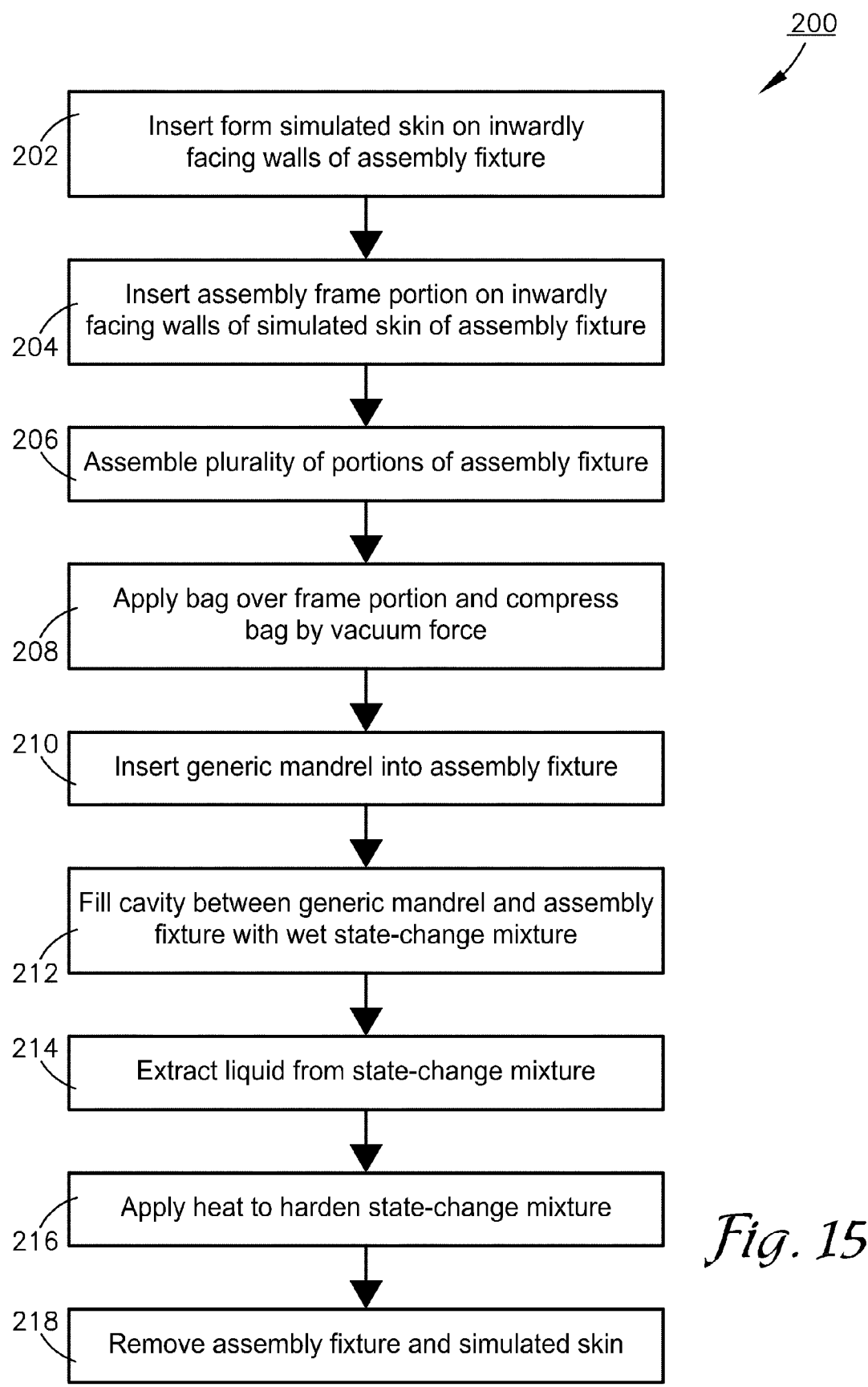
FIG. 15 is a flow chart illustrating method steps for forming the reconfigurable composite part mandrel of FIG. 10.

A method 200 of forming and using the reconfigurable composite part mandrel 12 using the system 10 described above is illustrated in FIG. 15. As depicted in step 202 and FIG. 3, the method may comprise inserting or forming the simulated skin 30 against the inwardly facing walls 20 of the assembly fixture 18. The method may also comprise inserting or assembling the frame portion 32 against the inwardly facing walls 20 of the assembly fixture 18 and/or against the simulated skin 30, as depicted in step 204 and FIG. 4. In various embodiments of the invention, steps 202 and 204 may be done to each of the plurality of portions 40,42 of the assembly fixture 18 individually, and then the plurality of portions 40,42 of the assembly fixture 18 may be assembled together to form one unified assembly fixture 18 having the hollow center 26, as depicted in FIG. 2 and step 206.

Figure 5:
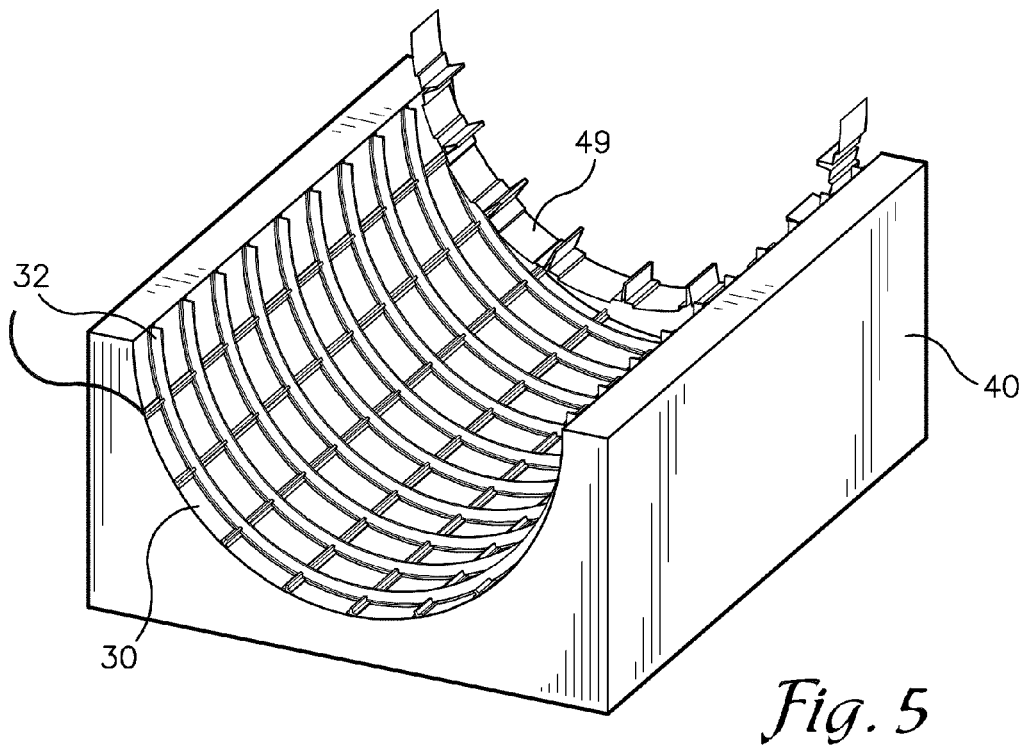
FIG. 5 is a perspective view of the frame portion of the system of FIG. 1 having release film strips applied therebetween.
Figure 6:
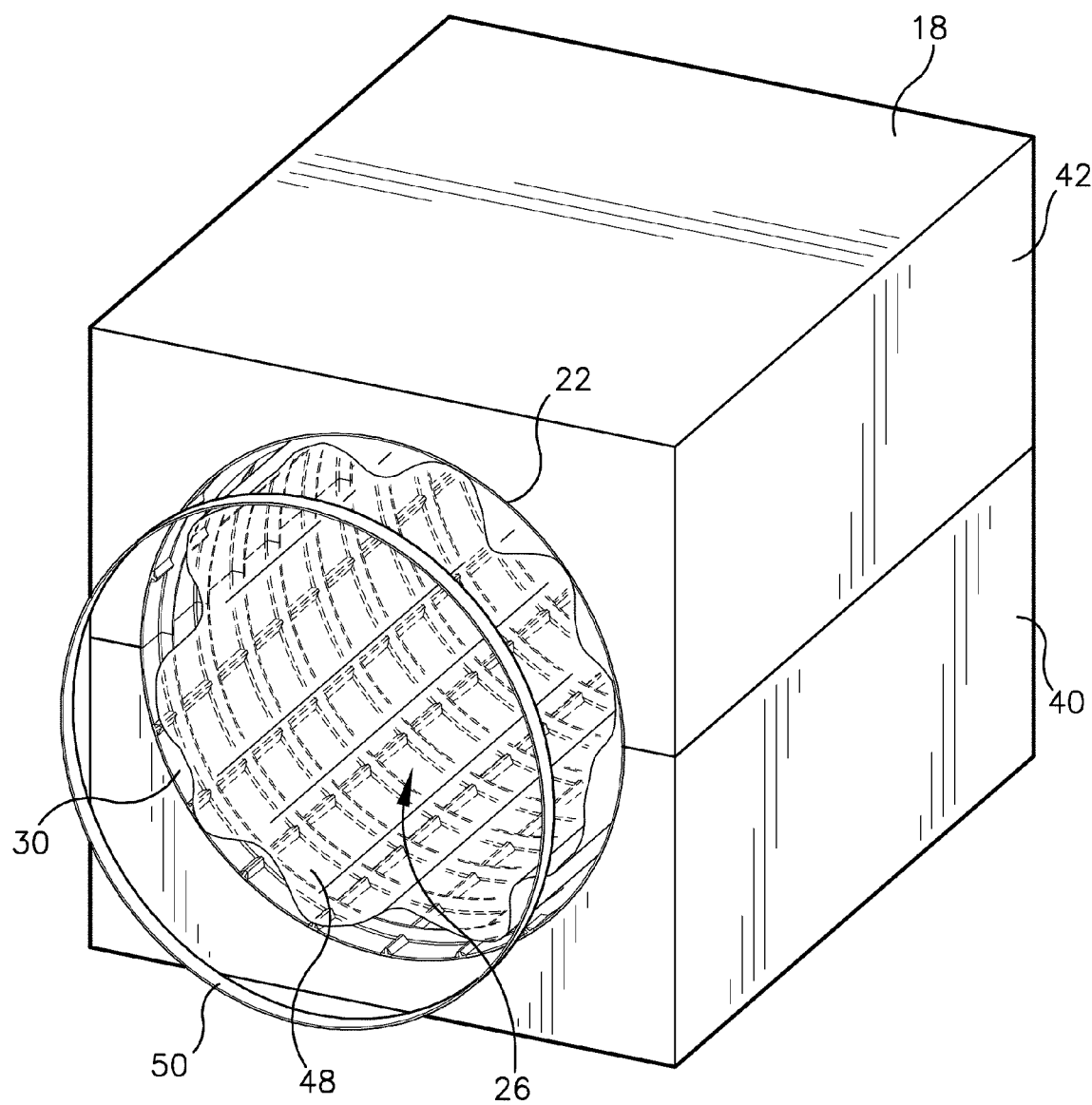
FIG. 6 is a perspective view of the assembly fixture of FIG. 2, including a bag for applying vacuum pressure to the frame portion and simulated skin.

The method may also comprise inserting a bag 48 over the frame portion 32 of the assembly fixture 18, as illustrated in FIG. 6, prior to inserting the generic mandrel 14, and then pulling the bag 48 down against the frame portion 32 by vacuum force, as depicted in step 208. Optionally, release film strips 49 may be placed between the frames and/or stringers to later prevent unwanted sticking of the bag 48 to an outer skin or a surface of the composite part, as illustrated in FIG. 5. The bag 48 may be a high-stretch tube bag or any other air-tight, sufficiently malleable material which may be sealed to at least a portion of the assembly fixture 18 and/or simulated skin 30. For example, as illustrated in FIG. 6, a vacuum transfer seal 50 may be used to hold the bag 48 against the assembly fixture 18 and/or simulated skin 30 such that vacuum force may extract air from between the inwardly facing walls 20 of the assembly fixture 18 and the bag 48, thereby compressing the bag 48 against the frame portion 32 and simulated skin 30.

As depicted in step 210 and FIG. 1, the method may further comprise inserting the generic mandrel 14 into the assembly fixture 18. For instance, the generic mandrel 14 may be positioned in the hollow center 26 of the assembly fixture 18 such that its middle portion 38 is in spaced relation to and does not touch the bag 48. Additionally, the first end 34 and second end 36 of the generic mandrel 14 may substantially seal off the first opening 22 and second opening 24 of the hollow center 26 of the assembly fixture 18, as illustrated in FIG. 7.

Figure 10:
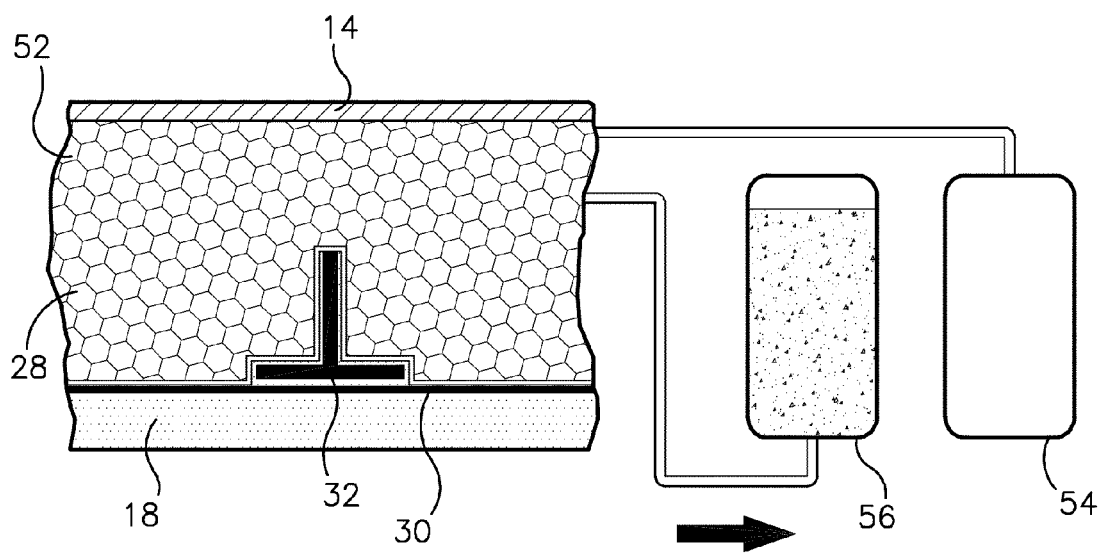
FIG. 10 is a partial, cross-sectional schematic view of the generic mandrel and the assembly fixture of FIG. 1 having liquid pumped out of the state-changing mixture disposed therebetween.

As illustrated in FIGS. 8-10 and depicted in step 212, the method may further comprise filling a cavity 52 between the generic mandrel 14 and the assembly fixture 18 with the state-changing mixture 28 to encapsulate the frame portion 32. Specifically, the cavity 52 may be the space between the bag 48 and the middle portion 38 of the generic mandrel 18, and the state-changing mixture 28 may be in a wet state, or a slurry state.

The wet state-changing mixture 28 may be pumped into the cavity 52 from a first tank 54, and then the liquid in the wet state-changing mixture 28 may be pumped out of the cavity 52 to a second tank 56, as depicted in step 214 and FIG. 10. Removing the liquid from the state-changing mixture 28 aids in hardening the state-changing mixture 28.

Then, as depicted in step 216, heat is applied to the state-changing mixture 28 to harden the state-changing mixture 28. Heat may be applied by any means known in the art. For example, the entire system 10 may be placed in an autoclave and heated until the state-changing mixture 28 solidifies. Then the assembly fixture 18 and the simulated skin 30 may be removed from the reconfigurable composite part mandrel 12, as illustrated in FIG. 11 and depicted in step 218. So the finished reconfigurable composite part mandrel 12 therefore may comprise the generic mandrel 14 and the hardened state-change mixture 28, and may also hold the frame portion 32 in place for applying composite material to the frame portion 32.

Figure 12:
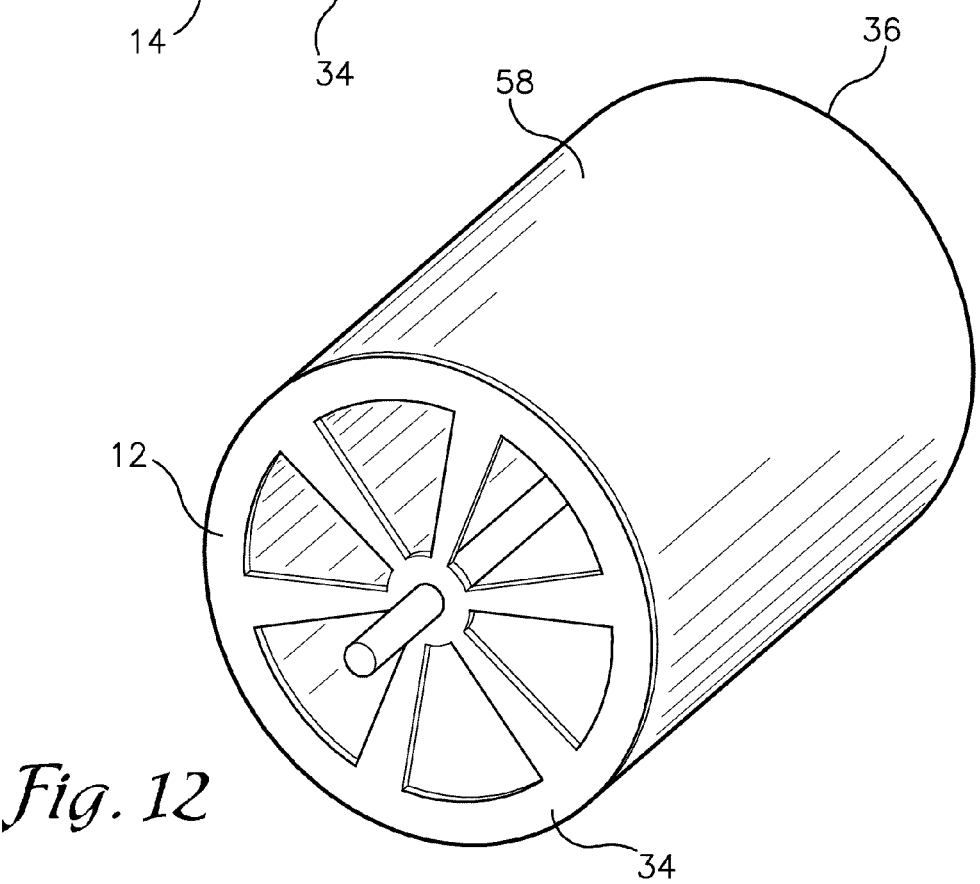
FIG. 12 is a perspective view of the reconfigurable composite part mandrel of FIG. 10 having composite material wrapped around it.
Figure 16:
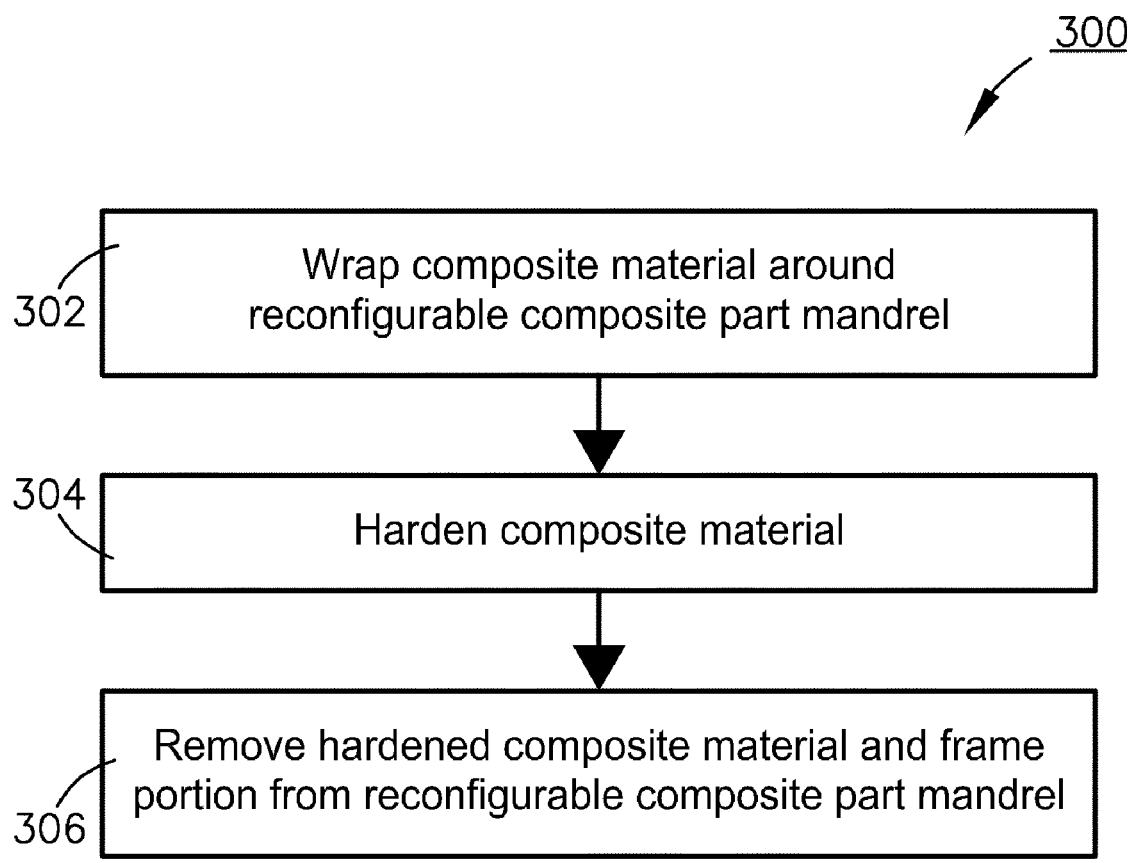
FIG. 16 is a flow chart illustrating method steps for using the reconfigurable composite part mandrel of FIG. 10 to form a composite part.

In use, a film adhesive (not shown) may be applied to exposed surfaces of the frame portion, and then composite material may be applied to the reconfigurable composite part mandrel 12. FIG. 16 illustrates a method 300 of using the reconfigurable composite part mandrel 12. The method 300 may comprise wrapping composite material 58 around the reconfigurable composite part mandrel 12, as depicted in step 302 and FIG. 12. For example, a user and/or automated apparatus may filament wind, fiber tow place, or lay-up composite skin plies over and/or around the reconfigurable composite part mandrel 12.

Figure 13:
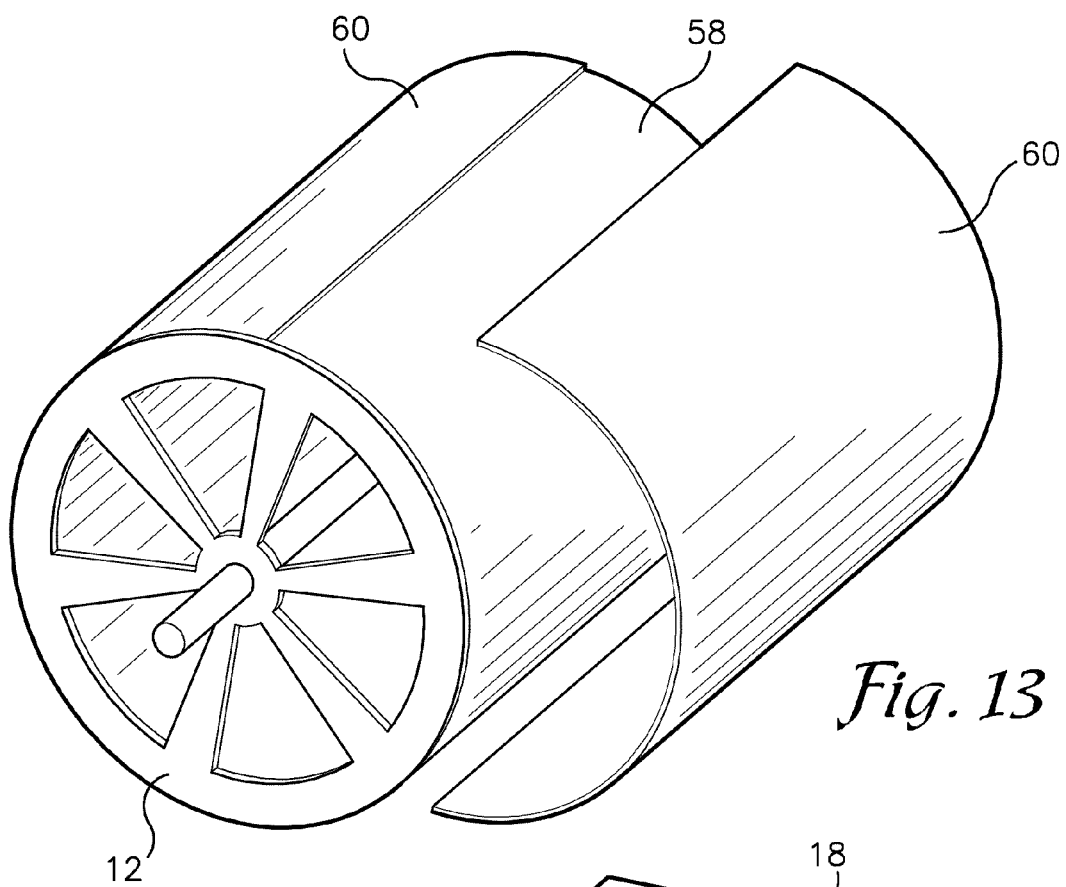
FIG. 13 is a perspective view of the reconfigurable composite part mandrel of FIG. 10 having a caul sheet applied to the composite material wrapped around it.
Figure 14:
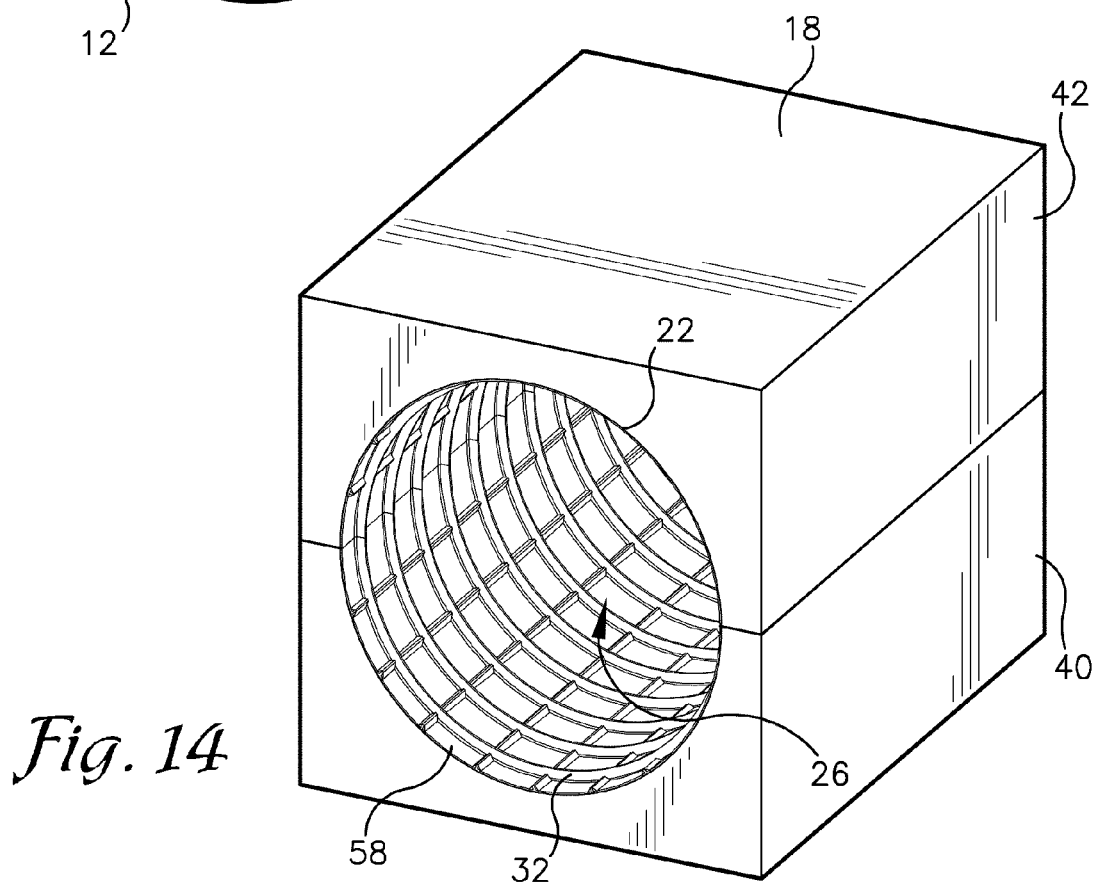
FIG. 14 is a perspective view of the assembly fixture having the composite material of FIG. 11 and the frame portion disposed therein for curing.

Then, as depicted in step 304, the composite material 58 may be hardened or cured in one of a plurality of ways. For example, the composite material 58 may be hardened by compressing the composite material 58 with caul sheets 60 and pressure applied by a vacuum bag and autoclave pressure, as illustrated in FIG. 13, then heating the composite material 58. Or, the composite material 58 may be hardened by inserting the reconfigurable composite part mandrel 12 and composite material 58 again into the assembly fixture 18, after the simulated skin as been removed, as illustrated in FIG. 7, then heating the composite material 58. Alternatively, the composite material 58 may be hardened by placing the composite material 58 and the frame portion 32 into the assembly fixture 18, transferring the vacuum transfer seal 50 to the assembly fixture 18, removing the state-changing mixture 28 and the generic mandrel 14, then heating the composite material 58 and pressurizing with a vacuum bag and autoclave pressure, as illustrated in FIG. 14.

Finally, the method 300 may comprise removing the hardened composite material 58 and the frame portion 32 from the reconfigurable composite part mandrel 12, as depicted in step 306. For example, removing the hardened composite material 58 from the reconfigurable composite part mandrel 12 may include adding liquid back into the hardened state-changing mixture 28 such that it becomes soft, allowing the hardened composite material 58 to slide off of the reconfigurable composite part mandrel 12. The frame portion 32 is co-bonded or co-cured with the hardened composite material 58, which may be composite fuselage skin.

The system 10 and method of making and using the reconfigurable composite part mandrel 12 provides numerous advantages over the prior art. For example, since all of the system's internal parts may be easily relocated, reconfiguring various design elements of the composite part 58, such as a fuselage, can be done quickly and inexpensively. For example, the frame portion 32 of a fuselage may be reconfigured, or a window of a fuselage may be moved without requiring extensive retooling of a mandrel or without manufacturing an entirely new mandrel. This may also allow building and evaluating various composite part design iterations quickly and at minimal cost to allow evaluation and optimization prior to production tool fabrication.

Although the invention has been described with reference to the embodiments illustrated in the attached drawings, it is noted that equivalents may be employed and substitutions made herein without departing from the scope of the invention as recited in the claims.

Having thus described an embodiment of the invention, what is claimed as new and desired to be protected by Letters Patent includes the following:

1. A method of forming and using a reconfigurable composite part mandrel, the method comprising:
    applying a simulated skin within an assembly fixture, wherein the simulated skin is configurable to represent a composite part to be formed;
    assembling a frame portion within the assembly fixture;
    inserting a generic mandrel into the assembly fixture;
    filling a cavity between the generic mandrel and the assembly fixture with a state-changing mixture to encapsulate the frame portion;
    hardening the state-changing mixture;
    removing the assembly fixture and the simulated skin;
    winding, laying up, or placing composite material around the frame portion, hardened state-changing mixture, and generic mandrel;
    inserting the composite material, frame portion, hardened state-changing mixture, and generic mandrel back into the assembly fixture; and
    curing the composite material in the assembly fixture.

2. The method of claim 1, further comprising inserting a bag over the frame portion and at least a portion of the assembly fixture prior to inserting the generic mandrel, and pulling the bag down against the frame portion by vacuum force.

3. The method of claim 1, wherein the state-changing mixture is hardened by pumping liquid contained in the state-changing mixture out of the cavity between the generic mandrel and the assembly fixture and heating the state-changing mixture.

4. The method of claim 1, further comprising applying liquid to the state-changing mixture to soften the mixture and allow the composite material and frame portion to slide off of the reconfigurable composite part mandrel.

5. The method of claim 1, wherein the assembly fixture is a clamshell or bond assembly jig.

* * * * *